United States Patent

McWilliams

[15] 3,656,610
[45] Apr. 18, 1972

[54] RESILIENTLY MOUNTED CONVEYOR BELT CLEANER

[72] Inventor: Michael R. McWilliams, Aurora, Ill.
[73] Assignee: Material Control, Inc., Aurora, Ill.
[22] Filed: July 15, 1970
[21] Appl. No.: 55,174

[52] U.S. Cl. ..................................................... 198/230
[51] Int. Cl. ........................................................ B65g 45/00
[58] Field of Search ........ 198/230, 220 AC, 220 CB, 220 CA

[56] References Cited

UNITED STATES PATENTS

| | | | |
|---|---|---|---|
| 3,342,312 | 9/1967 | Reiter | 198/230 |
| 2,854,130 | 9/1958 | Adams | 198/220 CA |
| 3,467,241 | 9/1969 | Oser | 198/220 CB |
| 3,476,234 | 11/1969 | Allen | 198/220 CB |

Primary Examiner—Richard E. Aegerter
Attorney—Whittemore, Hulbert & Belknap

[57] ABSTRACT

A resiliently mounted conveyor belt cleaner is provided to serve as a mechanical cleaner for an endless conveyor belt. The conveyor belt cleaner includes a plurality of independently operable spring-wiper blade assemblies for removing from the conveyor belt various types of abrasive and other objectionable foreign material. The spring-wiper blade assemblies each include a spring arm which is mounted by means of a resilient mounting structure which absorbs vibrations and shock and thereby minimizes fatigue of the spring arms to result in reduced breakage of the arms during use.

4 Claims, 7 Drawing Figures

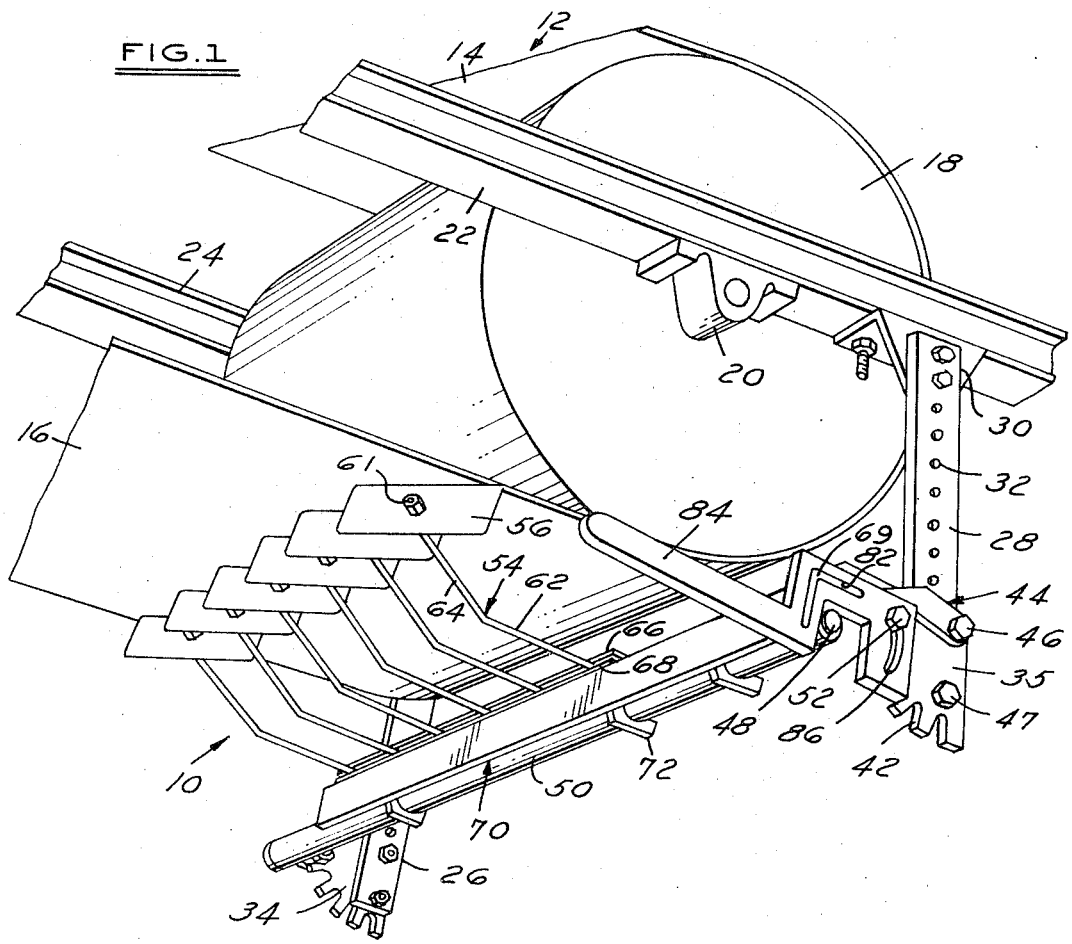
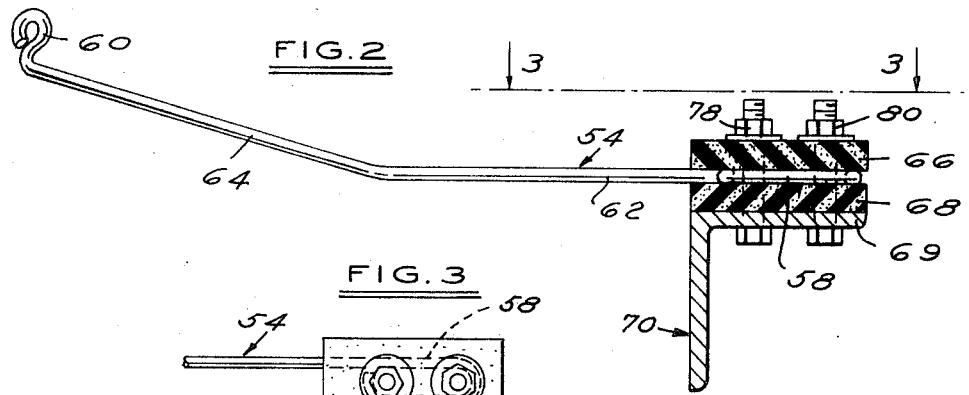
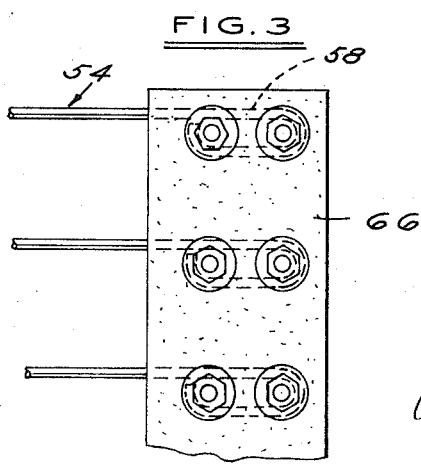
INVENTOR
MICHAEL R. McWILLIAMS

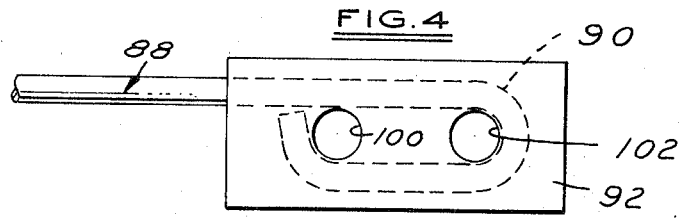
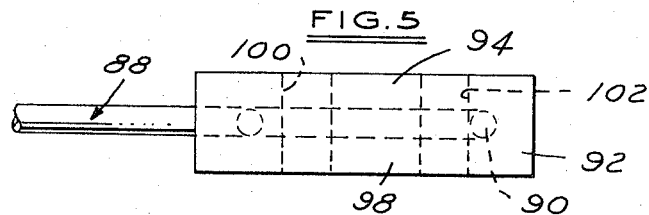
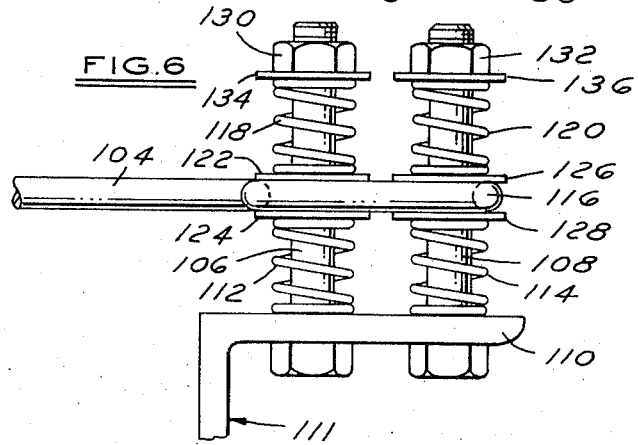
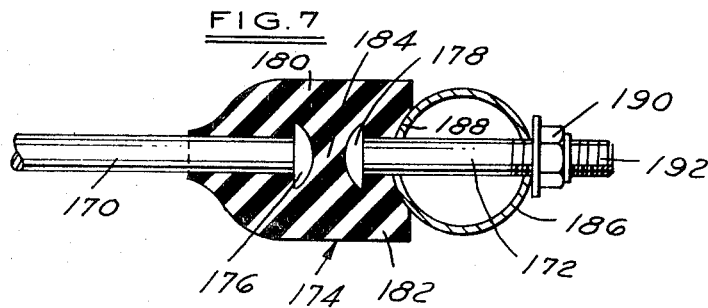

RESILIENTLY MOUNTED CONVEYOR BELT CLEANER

BACKGROUND OF THE INVENTION

In U.S. Pat. No. 3,342,312, issued Sept. 19, 1967, assigned to the assignee of record, there is disclosed a conveyor belt cleaner which is mountable underneath the return run of an endless conveyor belt. This cleaner assembly includes a plurality of torsion spring arms which are subjected primarily to bending and torsional forces during use. Each spring arm operates independently of the other spring arms. One end portion of each torsion spring arm is fixedly connected to the supporting frame of the conveyor structure by means of easily removable support structure forming part of the conveyor belt cleaner. The outer end of each spring arm is freely movable. The outer end is provided with a wiper blade which is engageable with the conveyor belt surface to clean and wipe objectionable material therefrom.

I have learned in use that the spring arm construction disclosed in the prior patent, while satisfactory in operation, is subjected to fatigue after repeated flexing over a long period of time. The result has been that the spring arms have broken or failed in use sooner than I consider desirable.

I have therefore provided a resilient mounting means for the spring arms which is interposed between the fixed end of the arms and the support structure. This resilient mounting means absorbs much of the shock occurring during flexure of the spring arms and appreciably reduces the problem of breakage due to fatigue.

SUMMARY OF THE INVENTION

The cleaner for a conveyor belt includes a support mountable transversely of the belt to be cleaned. A plurality of spaced apart spring arms are provided. Resilient mounting means secure one end portion of each spring arm to the support. A wiper blade, which is engageable with the conveyor belt, is carried on the other end of each spring arm. The resilient mounting means includes at least one resilient portion positioned on two opposed sides of said one end portion of each spring arm whereby the spring arm is resiliently supported upon flexure in at least two directions. The two directions are selected to coincide with movement towards and away from the conveyor belt.

In the drawings:

FIG. 1 is a perspective view of a portion of a belt conveyor with one embodiment of the resiliently mounted conveyor belt cleaner of the present invention installed thereon;

FIG. 2 is a side elevational view of one spring arm of the belt cleaner of FIG. 1 including a sectional view of the resilient mounting therefor;

FIG. 3 is a top plan view of the left hand portion of the belt cleaner of FIG. 1 viewed in the direction of arrows 3—3 of FIG. 2;

FIG. 4 is a top plan view of one end of a spring arm for the conveyor cleaner illustrating embedment thereof into a resilient block forming another embodiment of the invention;

FIG. 5 is a side elevational view of the FIG. 4 embodiment;

FIG. 6 is a side elevational view illustrating the mounting of a spring arm by means of metallic coil springs; and FIG. 7 is a side elevational sectional view illustrating resilient mounting of a spring arm by means of an elastomeric coupling structure.

FIG. 1 illustrates the overall conveyor belt cleaner structure 10 which forms the basic unit to which the various resilient mounting techniques forming the embodiments of the invention are applied. The structure 10 is installed on a conveyor 12 which is of conventional construction. The conveyor 12 includes an endless belt comprising an upper run 14 and a lower run 16 driven by means of a pair of rollers 18 (one shown), one provided at each end in the usual fashion. At least one of the rollers is powered by means of a motor (not shown). The rollers 18 are pivotally mounted by means of bearing structures 20 to a framework which includes horizontally extending frame elements 22, 24. Conveyor belt cleaner structure 10 includes a pair of elongated hanger elements 26, 28 which are bolted to hanger brackets 30 which in turn are bolted to the frame elements 22, 24. The hangers 26, 28 thus depend from the frame elements and extend to a point beneath the lower conveyor run 16. As will be noted, a plurality of spaced apart openings 32 are provided in each hanger element. These openings permit adjustment of the various components along the hanger elements to suit the dimensions of the particular conveyor structure upon which the belt cleaner structure is mounted.

Adjustable lock plates 34, 35 are secured to the lower end of the hangers 26, 28 by means of a pair of nut and bolt structures 46, 47 which extend through a pair of adjacent openings 32. Any desired pair of openings may be selected thus permitting vertical positioning of the lock plates to accommodate the particular conveyor structure upon which the belt cleaner structure is mounted. The outer edge portion of the lock plates is curved and is provided with a plurality of notches 42 which are utilized for rough adjustment of the cleaning structure.

A tube support arm 44 is provided on each hanger. The arms 44 are pivotably mounted at one end to the uppermost nut and bolt structure 46. The lower end of the arms carry studs 48 which are received in the ends of a tube 50 which extends across the lower run 16 of the conveyor between the support arms. A nut and bolt structure 52 is received through an opening in the arm 44. The nut and bolt structure 52 is positioned in one of the notches 42 to thereby roughly adjust the position of the tube 50.

The tube 50 functions as a support for a plurality of spring arms 54 each of which carries on its outer end a wiper blade 56 which contacts the under side of the lower conveyor run 16 to perform the cleaning action. The spring arms 54 are spaced apart and arranged in parallel with each other. Each of the spring arms 54 defines a torsion spring. The spring arms are elongated, slender and of circular cross-section. Each spring arm 54 is made from a single piece of spring steel with the rear end thereof bent back upon itself to form an elongated eyelet 58. The forward free end of each spring arm is also bent back upon itself to form an eyelet 60 upon which the blade is mounted by means of a nut and bolt structure 61. The rearward portions 62 of the spring arms extend straight outwardly from the tube 50 at substantially right angles thereto. The arms are bent intermediate the ends thereof to define a forward portion 64 which is bent upwardly and is also bent to one side of a vertical plane which extends parallel to the rearward portion 62.

The spring arms 54 are designed to withstand continual flexing and torsion forces created during the cleaning operation. During the cleaning operation, each spring arm 54 is subjected primarily to bending or torsional forces, with the fatigue points occuring adjacent either the eyelet 58 or the eyelet 60. The fatigue point may be defined as a place on the spring arm where breakage of the spring arm is more likely to occur due to the continued flexing thereof during the cleaning operation.

To avoid excessive vibration and fatigue of the spring arms leading to breakage thereof, the spring arms are resiliently mounted at the rearward end so as to absorb shock and dampen vibration but still permit sufficient flexing of the spring arms to accomplish the desired cleaning action.

The eyelets 58 of the spring arms are sandwiched between a pair of elongated flat elastomeric members 66, 68 which extend transversely of the lower conveyor belt run 16 and for substantially the width thereof. This assembly is secured to the upper leg 69 of an angle member 70. The angle member 70 is supported on the tube 50 by means of a plurality of C-clamps 72 which permit longitudinal sliding and pivoting of the angle member 70. The spring arms and elastomeric members 66, 68 are secured to the angle member 70 by means of a pair of spaced apart nut and bolt structures 78, 80 which extend through the eyelet 58 of each spring arm. The nut and bolt structures, because of the space therebetween, permit limited pivoting of the spring arm about a horizontal axis during flexing as an aid in shock absorbing. As will be noted, one end of the angle member is received in an angle-slot 82 of manually engageable handle 84. The handle 84 has an arcuate slot 86 at its forward end through which extends the bolt structure 52. The spring arm assembly and attached cleaning blades may be placed into proper pressure engagement with the underside of the conveyor run 16 by loosening the bolts 52 and manipulating the handle 84 upwardly or downwardly as the need dictates and then, when the proper blade pressure has been applied, tightening the bolts 52 to secure the cleaning assembly in place. This adjustment is a relatively fine adjustment which cooperates with the rough adjustment of the arm 44 previously mentioned to properly adjust the cleaning mechanism with respect to the conveyor belt. As will be noted, the blades 56 are set in overlapping relationship and at an angle so that the conveyor belt is satisfactorily cleaned.

The material of the resilient members 66, 68 may be either natural or synthetic rubber or other resinous material and is termed "elastomeric" within the scope of the invention to describe an elastic rubber-like substance. The elastomeric material may be either somewhat spongy or somewhat hard. It has been found that the resilient rate is preferably in the range of 20 to 60 durometer with a material having a 40 durometer being preferred.

In the sandwich structure provided for mounting the spring arms 54, shock will be absorbed in either the up or down flexing motion of the arms. When high wiper blade pressure is applied to or by the conveyor belt, the major portion of the shock will be absorbed by the elastomeric material. The elastomeric material will allow the spring arms the freedom of "floating" with the various shocks encountered along the conveyor run such as will occur with belt splices, large globules of material particles and the like. Additionally, the action of the resilient elastomeric material improves uniformity of flexing resulting from the torsion action of the spring arms themselves. A torsion spring, as a result of the nature of the manufacturing procedure utilized in the fabrication thereof, does not provide the uniformity of reaction obtainable with the elastomeric mounting. Uniformity is desirable in order that all wiper blades will contact the conveyor belt at the same point and with substantially the same pressure. The use of the elastomeric material also improves uniformity in spring rate at the initial point of deflection. The initial spring rate varies considerably in a coil torsion spring, whereas the initial spring rate per inch of deflection of a rubber mounted spring is more uniform. Additionally, it is quite easy to modify the spring rate merely by changing the rubber composition, that is, selecting a softer or harder durometer rubber. This permits easy control of spring arm deflection to suit different cleaning applications. One result of this uniformity is that the wiper blades will wear more evenly. Further, the natural "give" of the elastomeric material aids in keeping the wiper blades from being held in too tight a contact with the conveyor belt which would cause increased blade wear without a comparable increase in the cleaning action. These factors are all in addition to the decrease in spring arm breakage resulting from fatigue as a consequence of utilizing the resilient mount for the spring arms.

FIGS. 4 and 5 illustrate a modification of the embodiment illustrated in FIG. 1–3. The spring arm 88 is formed substantially in the manner of spring arm 54. However, rather than mounting the eyelet 90 between a pair of elongated flat resilient strips as in the previous embodiments, the eyelet 90 is embedded in the center of a resilient block 92 which is fabricated of elastomeric material. As will be noted, there is a layer of material 94 above the eyelet 90 and a layer 98 beneath the eyelet. Thus, the effect of the previous sandwich structure is obtained along with the desirable results thereof. A pair of spaced apart openings 100, 102 are provided through the block 92 for reception of the nut and bolt structures for mounting of the spring arms and, again, limited arm pivoting is possible. One advantage of the use of the block 92 is a more uniform contact with the eyelet portion 90 thus assuring even resilient pressure being applied thereto. Additionally, this embodiment is convenient to handle and store and is easy to install.

FIG. 6 illustrates other means for resiliently mounting a spring arm 104 which is again the same as spring arm 54 previously described. In this embodiment, a pair of elongated bolts 106, 108 extend through openings in the upper leg 110 of a supporting angle 111. A metallic coil spring 112, 114 is received on each bolt. The eyelet 116 of the spring arm 104 is then received on the bolts and a second pair of coil springs 118, 120 are received on the bolts above the eyelet. Washers 122, 124, 126, 128 are provided between the eyelet and the springs. Nuts 130, 132 and washers 134, 136 are received on the outer end of the bolts to maintain the assembly in place. The amount of spring pressure applied may be varied by the degree of tightening of the nuts 130, 132 onto the bolts. As will be appreciated, resilient flexing action with limited arm pivoting resulting in substantially the same benefits described in connection with the sandwich structure are obtained with the embodiment of FIG. 6.

FIG. 7 illustrates an additional embodiment for resilient mounting of a spring arm 170. In FIG. 7, the spring arm 170 is coupled to a mounting bolt 172 by means of a resilient block 174. The adjacent ends of the arm 170 and bolt 172 have enlarged heads 176, 178 for firm embedment in the block 174. It will be noted that material 180 of the block 174 is provided above the arm 170 and material 182 is provided below while additional material 184 separates the heads 176, 178.

The bolt 172 extends through openings provided in a tubular support 186. A surface portion 188 of the block 174 is indented and curved concavely to firmly abut against the tube 186. A washer and nut structure 190 is threadingly received on the threaded end 192 of the bolt to secure the spring arm in place. The tube 186, with a plurality of spaced apart spring arms mounted therein, is supported beneath a conveyor belt run by hanger and support structure as illustrated in FIG. 1.

The spring arm 170 is resiliently supported in a manner very similar to the spring arm illustrated in FIGS. 4 and 5. Additionally, by virtue of the bolt 172 also being embedded in the resilient block 174, a second flexure point is provided. As will be appreciated, the arm 170 may flex by distorting the block 174 and in turn the block 174 may deflect on the bolt 172. The sandwich structure principle as previously described is also obtained in the FIG. 7 embodiment.

What I claim as my invention is:

1. In a cleaner for a conveyor belt adapted to engage the belt on the return run from below including a support adapted to be mounted transversely of the belt to be cleaned, and a plurality of torsion springs, each torsion spring having one end portion secured to said support and having on the other end portion a wiper blade which is engageable with the belt, each of said torsion springs being in the form of an elongated arm of generally circular cross-section substantially equal in flexibility, in the length thereof between said end portions, in planes normal to and paralleling the direction of travel of said belt return run, the improvement comprising resilient mounting means securing said one end portion of each spring arm to said support, said resilient mounting means including at least one portion positioned on two opposite sides of said one end portion of each spring arm whereby the spring arm is resiliently supported upon flexure in at least two directions, said two directions being selected to coincide with movement towards and away from the conveyor belt, said one end portion of each spring arm including an elongated eyelet, fastening means securing said elastomeric portions and spring arm to said support, said fastening means comprising a pair of spaced apart nut and bolt structures passing through opening means in the support, resilient mounting means and said eyelet, said nut and bolt structures permitting limited pivoting of the spring arm.

2. A cleaner for a conveyor belt as defined in claim 1, further characterized in that said resilient mounting means comprises a block of elastomeric material completely embedding said one end portion of each spring arm.

3. In a cleaner for a conveyor belt adapted to engage the belt on the return run from below including a support adapted to be mounted transversely of the belt to be cleaned, and a plurality of torsion springs, each torsion spring having one end portion secured to said support and having on the other end portion a wiper blade which is engageable with the belt, each of said torsion springs being in the form of an elongated arm of generally circular cross-section substantially equal in flexibility, in the length thereof between said end portions, in planes normal to and paralleling the direction of travel of said belt return run, the improvement comprising resilient mounting means securing said one end portion of each spring arm to said support, said resilient mounting means comprising a block of elastomeric material completely embedding said one end portion of each spring arm.

4. A cleaner for a conveyor belt as defined in claim 3, further characterized in that said one end portion of each spring arm includes an elongated eyelet, fastening means securing said block and spring arm to said support, said fastening means comprising a pair of spaced apart nut and bolt structures passing through opening means in the support, elastomeric block and said eyelet, said nut and bolt structures permitting limited pivoting of the spring arm.

* * * * *